United States Patent [19]

Rynne et al.

[11] Patent Number: 4,950,936
[45] Date of Patent: Aug. 21, 1990

[54] PIEZOELECTRIC SANDWICH POLYMER TRANSDUCER

[75] Inventors: Edward F. Rynne; Jay C. Brown, both of San Diego, Calif.

[73] Assignee: The United States of America as represented by the Secretary of the Navy, Washington, D.C.

[21] Appl. No.: 241,873

[22] Filed: Mar. 9, 1981

[51] Int. Cl.$^5$ .......................................... H01L 41/08
[52] U.S. Cl. .................................. 310/337; 310/334; 310/800; 310/366; 367/155; 367/164
[58] Field of Search ............... 310/800, 334, 322, 336, 310/337, 338, 339, 366; 179/110 A; 367/153, 155, 164

[56] References Cited

U.S. PATENT DOCUMENTS 3,940,637  2/1976  Ohigashi et al. ................ 310/800 X
4,234,813  11/1980  Iguchi et al. ..................... 340/365 A

FOREIGN PATENT DOCUMENTS 2757099  6/1978  Fed. Rep. of Germany ...... 310/800
55-30243  3/1980  Japan .............................. 179/110 A Primary Examiner—Mark O. Budd
Attorney, Agent, or Firm—Harvey Fendelman; Thomas Glenn Keough

[57] ABSTRACT

A sensor, having a sandwich configuration, is able to sense a transduce output parameter in situ without significantly affecting the parameter. The sensor comprises an inner sheet of a polymer having a transducer property. A conductive layer is deposited on parts of at least one of the two surfaces of the inner sheet. A pair of outer sheets of plastic are attached to each side of the inner sheet. Two layers of conductive material may be deposited on the outer, unattached, surfaces of the outer sheets, one layer on each surface.

30 Claims, 2 Drawing Sheets

EXPLODED VIEW OF PIEZOELECTRIC POLYMER ARRAY
AND TRANSDUCER WITH WHICH IT IS USED

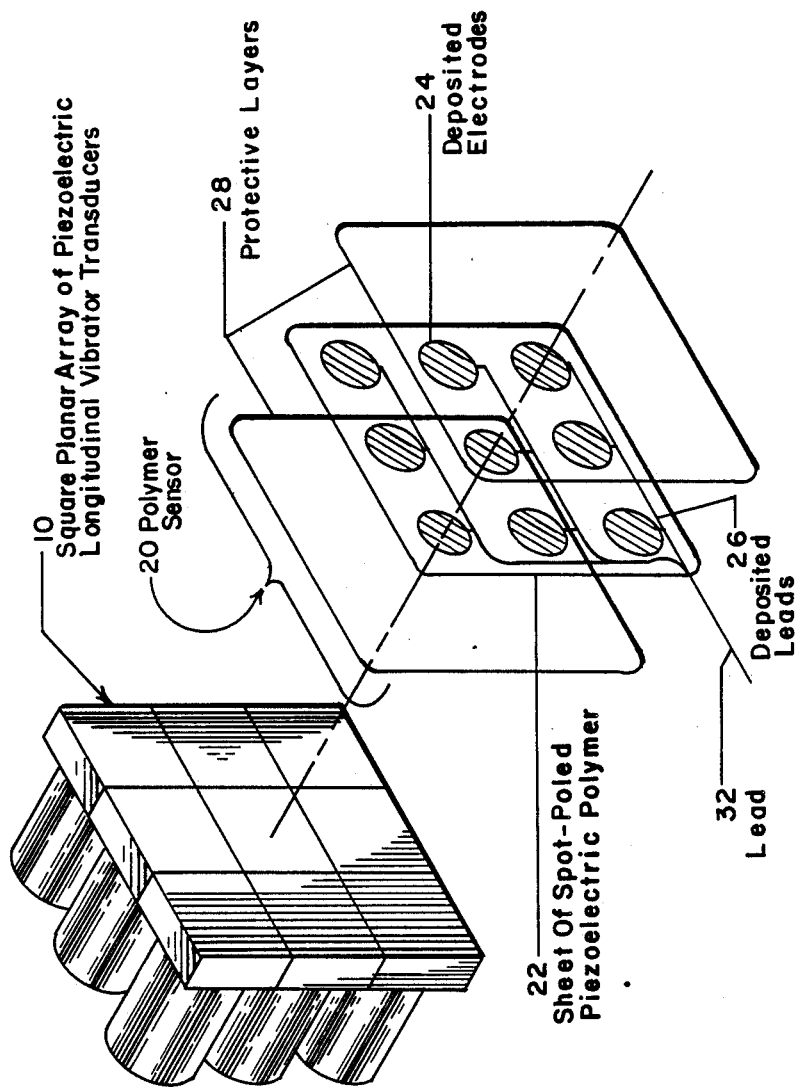
FIG. 1 EXPLODED VIEW OF PIEZOELECTRIC POLYMER ARRAY AND TRANSDUCER WITH WHICH IT IS USED

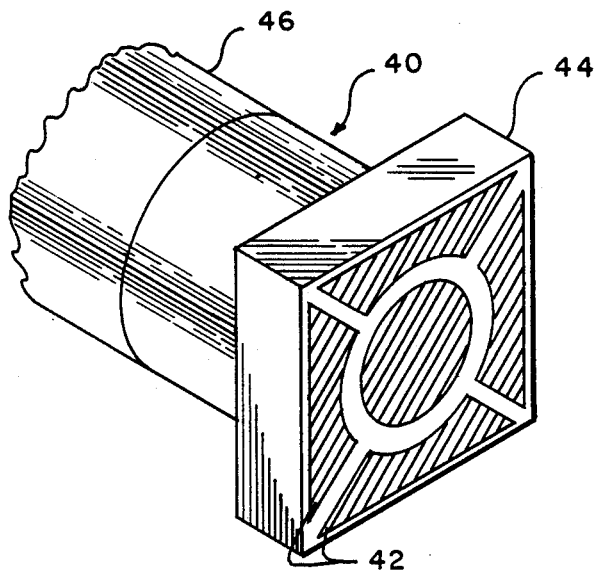
FIG. 2  FIRST ELECTRODE PATTERN FOR POLYMER SENSOR ATTACHED TO THE HEAD OF A PIEZOELECTRIC CERAMIC TRANSDUCER.
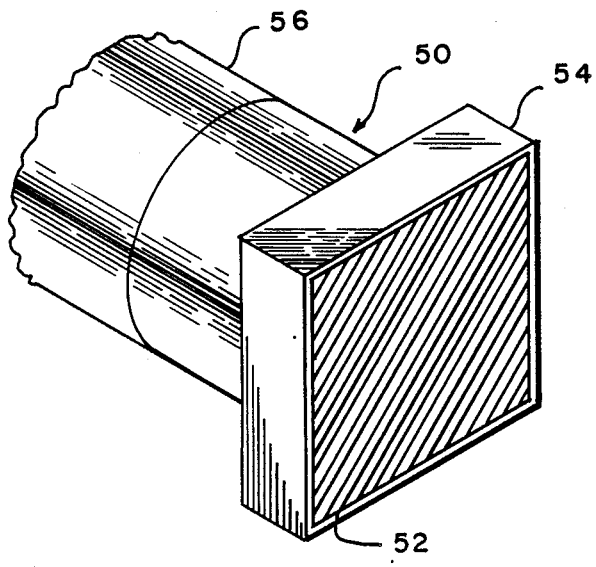
FIG. 3  SECOND ELECTRODE PATTERN FOR POLYMER SENSOR.

PIEZOELECTRIC SANDWICH POLYMER TRANSDUCER

STATEMENT OF GOVERNMENT INTEREST

The invention described herein may manufactured and used by or for the Government of the United States of America for governmental purposes without the payment of any royalties thereon or therefor.

BACKGROUND OF THE INVENTION

There are two basic prior art methods which have been applied to the investigation of sonar array performance. These may be classed as a theoretical/math modeling approach or as an experimental approach.

Despite the interest in sonar performance, mathematical modeling of arrays has developed slowly. Due to the complexities of element interactions, as well as interstitial and baffle effects, useful models have been restricted to a few simple geometries and, usually, to steady-state analyses. While some techniques have been applied to the transient case, they have required a priori knowledge of the velocity distributions in the array.

These prior art methods are described by (1) Stephanishen, P. R., "Transient Radiation from Pistons in an Infinite Planar Baffle", JASA, Vol 49, No. 5 (Part 2), 1971; and (2) Stepanishen, P. R., "An Approach to Computing Time-Dependent Interaction Forces and Mutual Radiation Impedances between Pistons in a Rigid Planar Baffle," JASA, Vol. 49, No. 1 (Part 2, 1971).

The simplifying assumptions, as well as incomplete knowledge of the operational environment of specific arrays, are basic limitations and often lead to large discrepancies between model predictions and actual array performance. An additional limitation is the large amount of computer memory and run time necessary to implement detailed models.

Three experimental methods have been applied to measurements of array parameters. These methods may be categorized as:

(1) interferometric methods, including holography;
(2) accelerometer methods; and
(3) acoustic loading methods.

The first, interferometric, method is capable of detecting displacements down to half the wavelength of the radiation used (light or sound). Interferometry or real-time stroboscopic holography can measure the magnitude of this displacement, though standard double-pulse holography does not record this information. A common problem, however, is that the actual displacements may be less than can be easily resolved for the case of a radiation-loaded transducer.

The second method employs accelerometers mounted directly to the radiating face of each array element. While the sensitivity of the accelerometer is high, its bandwidth is insufficient for doing transient studies. It is generally recommended that the resonant frequency of the accelerometer be at least five times that of the frequency of interest. This method is described by the ENDEVCO Corp. in their Instruction Manual, entitled "Piezoelectric Accelerometers".

Additionally, the metal encased accelerometers are sufficiently heavy to cause a noticeable parameter shift in the transducer and may be a significant portion of a wavelength in size at sonar frequencies. It is, furthermore, impractical to include such devices as a permanent part of the array.

The third, acoustic loading, technique employs a complementary array which, when electrically terminated in the proper manner, can be used as a dynamic mechanical load for the array under test. When thus properly loaded, an array may be driven to high power and its electrical parameters measured. As the complementary array has bandwidth capabilities similar to the first array, the technique cannot be applied for transient measurements, and may only be used if the array is planar.

SUMMARY OF THE INVENTION

A piezoelectric polymer array, used as a transducer sensor, comprises a sheet of ferroelectric polymer sandwiched between two protective layers of plastic, for example mylar.

The sheet of polymer has poles formed in it to conform to the configuration of the transducer array with which it is used, each pole being situated opposite a transducer to be used with the array. Although it is a ferroelectric material, it exhibits piezoelectric behavior. The sheet has electrodes deposited on either side of it.

The sheets of plastic are metallized on their outside surfaces to provide electrical isolation.

Electrical leads may comprise either discrete wires bonded to the electrodes, or a pattern of conductors deposited on either the polymer or on the inside surfaces of the protective sheets.

OBJECTS OF THE INVENTION

An object of the invention is to provide a sensor which can measure transducer parameters in situ.

Another object of the invention is to provide such a sensor which allows direct measurement of the transient behavior of a sonar array or transducer.

Yet another object of the invention is to provide a sensor which can be used to detect and measure wave motion of a non-planar nature.

Still another object of the invention is to provide a sensor which is acoustically transparent and can be made a permanent part of the sonar system in which it is used.

A further object of the invention is to provide a sensor which is lightweight and can therefore be used with an array with essentially no weight or volume penalty.

BRIEF DESCRIPTION OF THE DRAWINGS

FIG. 1 is an exploded view of the piezoelectric polymer array sensor of this invention.

FIG. 2 is a first electrode pattern for a polymer sensor attached to the head of a piezoelectric ceramic transducer.

FIG. 3 is a second electrode pattern for a polymer sensor.

DESCRIPTION OF THE PREFERRED EMBODIMENTS

Referring now to FIG. 1, therein is shown a square planar array of piezoelectric longitudinal vibrator transducers 10 and a polymer sensor 20 which is used to measure the properties of the array 10. The sensor 20 has a sandwich-type configuration which is able to sense the transducer output parameter in situ without significantly affecting the parameter.

The sensor 20 comprises an inner sheet 22 of a piezoelectric polymer having a transducer property. The polymer may be vinylidene fluoride and has electrodes 24 in the form of conductive layers deposited on each side of it.

A pair of outer protective layers 28 are attached to each side of the inner sheet 22 of polymer. The plastic layers 28 may be mylar. The mode of attachment of the protective layers 28 to the sheet of polymer 22 may be thermal. The layers of the protective sheets 28 may be metallized to provide electrical isolation.

Electrical leads 26 may be used in the form of either discrete wires bonded to the electrodes 24, or a pattern of conductors 26 deposited on either the polymer 22 or on the protective sheets 28.

FIGS. 2 and 3 show two electrode patterns, 40 and 50, for a polymer sensor, 42 or 52, attached to the head, 44 and 54, of a piezoelectric ceramic transducer, 46 or 56.

Previously developed piezoelectric polymer devices that have been described in the prior art for 3-3 mode operation operate at a frequency where the film is one wavelength thick. The device described herein, acting as an accelerometer, operates at frequencies more than five times lower than the thickness mode resonance. These operating frequencies are in keeping with procedures for operating acceleration transducers. Once completed, the device, or array of devices, is affixed to the array to be tested. The relative high drive capability allows the device to drive measurement instrumentation, often without the need for preamplification. Being located in the extreme near field of the transducer or array to be tested and being well coupled to it, the polymer device may be driven by a signal source to test the receive characteristics of the element or array.

For the case of the transducer head with a nonuniform velocity distribution, the polymer sensor may itself be subdivided into an array by application of electrode and leads to several discrete regions of the polymer film. This is shown in FIG. 1. In this way the acceleration may be determined for each of the regions.

In addition to the advantages described hereinabove, the device has other advantages:

(1) The device acts as both a sound receiver and source allowing complete measurement of a sonar array's performance.

(2) The output allows the device to directly drive measuring instrumentation often without the need for preamplification.

(3) The materials used in the device are rugged and not susceptible to damage due to mechanical shock.

(4) The device may be used for measuring such parameters as resonance, antiresonance, mechanical and electrical Q, and the transducer's loaded transient response.

The device exploits a variety of construction techniques and materials for using the polymer in its 3-3 mode. These include techniques for "spot" poling of the polymer, deposition of electrodes and lead patterns, potting or laminating the polymer between protective layers and application of shielding materials. Further, it includes piezoelectric polymer grown epitaxially as well as application of hybrid and flexible circuitry technology for including preamplifiers, preprocessing circuits and transmit/receive switches in the device. The associated methodology incorporates thin acoustically transparent transducer arrays which may be used in situ but which do not interfere with normal sonar/transducer operation. The device and/or arrays of the devices may be used for test, fault detection, exercise, or beam steering control.

Obviously, many modifications and variations of the present invention are possible in the light of the above teachings. It is therefore to be understood that within the scope of the appended claims the invention may be practiced otherwise than as specifically described.

What is claimed is:

1. A sensor having a sandwich configuration, which is able to sense a transducer output parameter in situ without significantly affecting the parameter, comprising:
   an inner sheet of a polymer having a transducer property;
   a conductive layer deposited on parts of the two surfaces of the inner sheet so as to form electrodes thereon; and
   a pair of outer sheets of plastic thermally attached to each side of the inner sheet.

2. The sensor according to claim 1, wherein:
   the transducer property is piezoelectricity and the polymer is vinylidene fluoride.

3. The sensor according to claim 2, wherein:
   the inner polymer sheet is spot poled opposite the face of the transducer with which it is to be used.

4. The sensor according to claim 3, further comprising:
   conductive leads deposited on at least one of the two surfaces of the inner sheet in a manner to make electrical contact with the conductive layers.

5. The sensor according to claim 4, wherein:
   the plastic for the outer sheets is mylar.

6. The sensor according to claim 5, further comprising:
   two layers of conductive material deposited on the outer, unattached, surfaces of the outer sheets, one layer on each surface.

7. The sensor according to claim 6, wherein:
   the deposited conductive layers are configured to correspond to the shape of the transducer with which the sensor is to be used.

8. A sensor having a sandwich configuration, which is able to sense a transducer output parameter in situ without significantly affecting the parameter, comprising:
   an inner sheet of a polymer having a transducer property;
   a pair of outer sheets of plastic, one sheet being thermally attached to each side of the inner sheet; and
   at least one conductive layer deposited on parts of the inner surface of at least one of the outer sheets.

9. The sensor according to claim 8, wherein:
   the transducer property is piezoelectricity, and the polymer is vinylidene fluoride.

10. The sensor according to claim 9, wherein:
    the inner polymer sheet is spot poled opposite the face of the transducer with which it is to be used.

11. The sensor according to claim 10, further comprising:
    conductive leads deposited on at least one of the two surfaces of the inner sheet in a manner to make electrical contact with the conductive layers.

12. The sensor according to claim 11, wherein:
    the plastic for the outer sheets is mylar.

13. The sensor according to claim 11, further comprising:

two layers of conductive material deposited on the outer, unattached, surfaces of the outer sheets, one layer on each surface.

14. The sensor according to claim 13, wherein: the deposited conductive layers are configured to correspond to the shape of the transducer with which the sensor is to be used.

15. A combination comprising:
a transducer having at least two elements; and
a sensor, adjacent the transducer, having a sandwich configuration, which is able to sense an output parameter of the transducer in situ without significantly affecting the parameter, comprising:
an inner sheet of a polymer having a transducer property;
a conductive layer deposited on parts of the two surfaces of the inner sheet so as to form electrodes thereon; and
a pair of outer sheets of plastic being attached to each side of the inner sheet.

16. The sensor according to claim 15, wherein: the transducer property is piezoelectricity and the polymer is vinylidene fluoride.

17. The sensor according to claim 16, wherein: the inner polymer sheet is spot poled opposite the face of the transducer with which it is used.

18. The sensor according to claim 17, further comprising:
conductive leads deposited on at least one of the two surfaces of the inner sheet in a manner to make electrical contact with the conductive layers.

19. The sensor according to claim 18, wherein: the outer sheets are attached thermally to the inner sheet.

20. The sensor according to claim 19, wherein: the plastic for the outer sheets is mylar.

21. The sensor according to claim 20, further comprising:
two layers of conductive material deposited on the outer, unattached, surfaces of the outer sheets, one layer on each surface.

22. The sensor according to claim 21, wherein: the deposited conductive layers are configured to correspond to the shape of the transducer with which the sensor is used.

23. A combination comprising:
a transducer having at least two elements; and
a sensor, adjacent the transducer, having a sandwich configuration, which is able to sense the transducer output parameter in situ without significantly affecting the parameter, comprising:
an inner sheet of a polymer having a transducer property;
a pair of outer sheets of plastic, one sheet being attached to each side of the inner sheet; and
at least one conductive layer deposited on parts of the inner surface of at least one of the outer sheets.

24. The sensor according to claim 23, wherein: the transducer property is piezoelectricity, and the polymer is vinylidene fluoride.

25. The sensor according to claim 24, wherein: the inner polymer sheet is spot poled opposite the face of the transducer with which it is used.

26. The sensor according to claim 25, further comprising:
conductive leads deposited on at least one of the two surfaces of the inner sheet in a manner to make electrical contact with the conductive layers.

27. The sensor according to claim 26, wherein: the outer sheets are attached thermally to the inner sheet.

28. The sensor according to claim 27, wherein: the plastic for the outer sheets is mylar.

29. The sensor according to claim 27, further comprising:
two layers of conductive material deposited on the outer, unattached, surfaces of the outer sheets, one layer on each surface.

30. The sensor according to claim 29, wherein: the deposited conductive layers are configured to correspond to the shape of the transducer with which the sensor is used.

* * * * *